INVENTOR
George H. Stegkemper
BY
Evans + McCoy
ATTORNEYS

Sept. 20, 1949.　　　　　G. H. STEGKEMPER　　　　　2,482,298
TRANSMISSION

Filed Sept. 5, 1947　　　　　　　　　　　　　　3 Sheets-Sheet 2

INVENTOR
George H. Stegkemper
BY
Evans + McCoy
ATTORNEYS

Sept. 20, 1949.    G. H. STEGKEMPER    2,482,298
TRANSMISSION

Filed Sept. 5, 1947    3 Sheets-Sheet 3

INVENTOR
George H. Stegkemper
BY  Evans + McCoy
ATTORNEYS

Patented Sept. 20, 1949

2,482,298

UNITED STATES PATENT OFFICE 2,482,298

TRANSMISSION

George H. Stegkemper, Parma, Ohio

Application September 5, 1947, Serial No. 772,449

8 Claims. (Cl. 74—773)

This invention relates to power transmitting devices and more particularly to transmission structures for effecting speed changes or reversals while in continuous operation without the necessity for shifting or changing gears and in which a positive drive connection is at all times maintained between driving and driven shafts.

It is an object of the invention to provide a transmission in which a differential drive or a rotation of the driven shaft in a different direction or at a different rate of speed than the driving shaft is established through a gear train and in which a direct drive between the shafts is established while maintaining the gears of the gear train in mesh. More specifically, the invention seeks to provide such a transmission in which the direct drive is established by improved method of and apparatus for locking the gears of the gear train against rotation so that bodily movement of the gear train about the driving and driven shafts is effected to establish a direct drive connection.

Another object is to provide a transmission structure in which is provided a control for locking the gears of a connecting gear train against relative rotation and at the same time releasing a cage structure which carries the gear train for bodily rotation with the driving and driven shafts.

Another object is to provide in a transmission having a gear train an improved method of and mechanism for locking the gear train against rotation. In its preferred aspect this phase of the invention contemplates the use of rod connected rotatable stub shafts, which are relatively shiftable, so that the connecting rods can be made to effect a mechanical interlock which prevents rotation of the shafts, thereby restraining against rotation one or more of the gears of the gear train carried thereby and establishing a direct driving connection between the driving and driven shafts connected by the gear train. As a further refinement of this aspect of the invention, the stub shafts which mount the connecting rods are journaled in a cage rotatable about the driving and driven shafts of the transmission, one of the stub shafts being fixed and the other being laterally shiftable to vary the spacing between the stub shafts in effecting the rotation preventing mechanical interlock by means of the connecting rods.

Further objects and advantages of the invention reside in certain details of construction and arrangements of parts having to do with simplicity and economy of design, all of which will become apparent as the description of a suitable embodiment proceeds. This description is made in connection with the accompanying drawings forming a part of this specification and in which like parts throughout the several views are indicated by the same numerals of reference:

Figure 1:
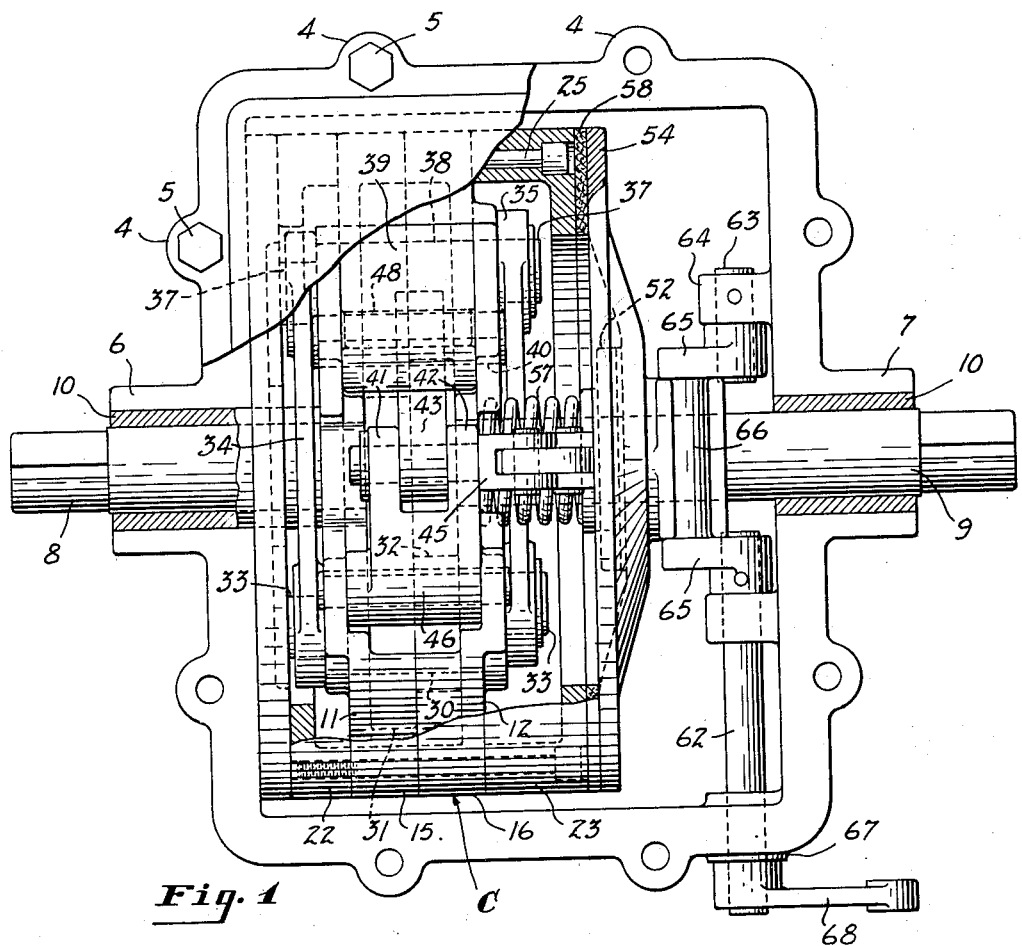
Figure 1 is a plan view, partly in section and with parts broken away and removed, showing a transmission incorporating the principles of the present invention.

The transmission of the present invention may be used in various applications such as in the drive connection between the motor and traction wheels of vehicles, between the motor and propeller of power boats, and in machinery having different speed and torque requirements such as in the case of hoists and derricks where it is desirable to maintain at all times, a positive driving connection to avoid loss or dropping of the load. The present disclosure is confined to the transmission itself, it being understood that the driving and driven shafts thereof may be longer than shown or may be otherwise connected into a drive mechanism.

The transmission is enclosed in a casing or housing comprising top and bottom sections 1 and 2 which are joined along a parting line 3, each section being formed with ears 4 secured together by bolts or screws 5. The opposite ends of the casing parts are formed to provide elongated sleeves or journal bosses 6 and 7 which support driving and driven shafts 8 and 9 respectively. The shafts are disposed in end to end coaxial alignment and antifriction means such as bushings 10 are fitted in the journals 6 and 7, the shafts having running fits therein. Grease or other lubricant is maintained within the casing and the casing may be supported in the structure of the machine, vehicle, or apparatus with which it is to be used.

A cage structure indicated generally at C is disposed within the casing and is rotatable about the shafts 8 and 9. The cage comprises a pair of spaced parallel cross members 11 and 12 which are centrally apertured to receive the shafts 8 and 9 respectively, so as to be rotatably supported thereon. The cross members are formed along their outer edges with peripheral arcuate flanges 15 and 16 which are of the same radius and abut one another along a parting line 17. A pair of spaced parallel rings 20 and 21 are disposed on the outside of the cross members 11 and 12 in concentric relation to the shafts 8 and 9 and are formed with axially directed arcuate flanges 22 and 23 that abut the peripheries of the cross members 11 and 12 respectively, to space the rings from the latter. Bolts 25 extend through aligned axial holes in the peripheries of the rings and cross members to hold the parts together in assembled relation, the heads of the bolts being recessed in one of the rings.

The inner ends of the driving and driven shafts 8 and 9 abut one another within the cage structure and are fitted with gears 26 and 27 which may be keyed or shrunk on the shafts or formed integrally therewith, as shown.

A stub shaft 30 is journalled in the cross members 11 and 12 for rotation about an axis which parallels the axis of the main shafts 8 and 9. Secured on the stub shaft 30 so as to rotate the latter is a composite or double gear having a large spur gear 31 which meshes with a relatively small gear 26 on the drive shaft 8, and having a relatively small spur gear 32 which meshes with the relatively large gear 27 secured on the driven shaft 9. Thus the shaft gears 26 and 27 and the composite gear spurs 31 and 32 comprise a gear train interconnecting the drive shaft 8 and the driven shaft 9 for differential rotation. The gears of the train are constantly in mesh and when the cage C is held stationary to prevent orbital movement of the composite gear about the gears 26 and 27 rotation of the drive shaft 8 operates to rotate or actuate the driven shaft 9 in the same direction but at a relatively slower rate of speed. Reversing the relative positions of the large and small gears has the effect of changing the speed differential so that when the drive is through the gear train the driven shaft rotates at a relatively higher rotational speed than the drive shaft.

The stub shaft 30 projects through the journals in the cross members 11 and 12 and on its ends is formed with eccentrics 33 which are angularly displaced from one another, preferably at about 90°. These eccentrics mount connecting rods 34 and 35 which are disposed on the outside of the cross members 11 and 12 and are formed with large central cut-outs or openings 36 which receive the shafts 8 and 9. The eccentrics 33 turn in the ends of the connecting rods 34 and 35 to reciprocate the latter when the shaft 30 is turned by the gear train. The other ends of the connecting rods 34 and 35 are received to turn on eccentrics 37 of a second stub shaft 38 which is journalled in one end of an arm 39 pivoted on a pin 40 which extends between and is secured in the cross members 11 and 12.

The stub shafts 30 and 38 are approximately diametrically disposed on opposite sides of the main shafts 8 and 9 and rotatable on parallel axes, also parallel to the axes of the main shafts. The stub shafts are relatively movable toward and away from one another, the stub shaft 30 being fixed in the cage and the stub shaft 38 being movable. The swinging movement of the arm 39 on the pin 40 is governed by a toggle arrangement carried by the cage and disposed between the cross members 11 and 12 thereof. The toggle includes a relatively wide link 46 having a pair of parallel ends 41 and 42 and a link 43. The link 46 is pivoted at one end on a pin 44 which is secured between the cross members 11 and 12. The spaced ends 41 and 42 of the link 46 are pivotally received on a clevis pin 45 which also receives one end of the link 43, the latter being disposed on the pin between the link ends 41 and 42. The other end of the link 43 extends into a central opening 47 formed in the arm 39 intermediate the ends of the latter and is pivoted on a pin 48 secured in the arm.

The bifurcated end of the clevis pin 45 extends through a lateral opening in the cross member 12 and carries a pin 49 which receives one end of a radial connecting link 50. A flanged collar 52, rotatable on the driven shaft 9, is formed on one side with a pair of ears between which is received the other end of the connecting link 50, a pin 53 passing through an aperture in the pin and being secured in the ears of the collar.

The position of the collar 52 axially along the driven shaft 9 is governed by a disc 54 having an integral hub 55 rotatably received on the shaft, the collar 52 bearing against an anti-friction washer 56 interposed between the collar and the disc hub. The collar is urged against the disc or to the right, as viewed in Figs. 1 and 3, by a helical coil compression spring 57 which surrounds the shaft 9 and is compressed between the cross member 12 of the cage and the collar 52, the latter having a circumferential locating shoulder to center the spring about the shaft.

A flat circular ring 58 of wear resisting material is secured against a peripheral radial face 59 of the disc 54 so as to bear flatwise against a mating frictional surface 60 formed on the outside of the cage ring 21.

Axial movement along the driven shaft 9 is imparted to the disc 54 by a crank structure which comprises rod portions 62 and 63, mounted to turn in journals 64 formed on the inside of the bottom casing 2, and arms 65 between which extends a pin or throw 66. Rod portion 62 extends through the bottom casing portion 2, being journaled in a boss 67 and having an actuating arm 68 secured thereto on the outside of the casing. The pin 66 is received in a transverse open topped slot or channel 69 formed in the upper part of the disc hub 55. The arms 65 embrace flat parallel sides of the hub to prevent turning of the latter. The actuating arm 68 is connected by suitable linkage, not shown, accessible to the operator of the machine or vehicle incorporating the transmission so that the arm may be shifted in governing the operation of the transmission.

Figure 2:
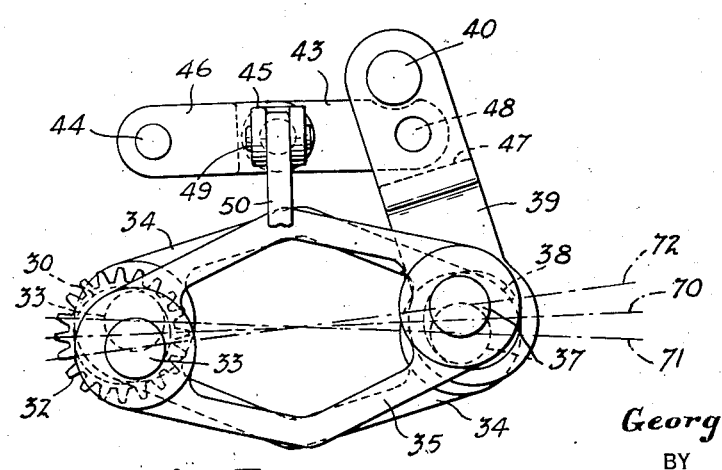
Fig. 2 is a fragmentary detail showing the gear controlling connecting rods.

The compression spring 57, assembled under an initial load on the shaft 9 between the cross member 12 and the collar 52, normally acts to move the collar and the disc 54 away from the ring 21 permitting the cage C to rotate bodily with the shafts 8 and 9 which are locked in direct drive relation by reason of the accompanying relative movement apart of the stub shafts 30 and 38 to approximately the positions illustrated in Fig. 2. The movement of the collar 52 to the right, as viewed in Figs. 1, 2 and 3, allows the toggle links 46 and 43 to expand approximately to the positions shown in Fig. 2. This spreading out or extension of the toggle arrangement swings the arm 39 to the right or in counterclockwise direction, as viewed in Figs. 2 and 4, permitting the movement apart of the stub shafts 30 and 38 that allows the connecting rods 34 and 35 to move into crossed relation in which the stub shafts are locked against rotation. This crossed relation of the connecting rods is illustrated in Fig. 2 in which line 70 represents the plane of the stub shaft axes, line 71 indicates the plane of the axes of the eccentrics carrying the connecting rod 34, and line 72 represents the plane of the axes of the eccentrics carrying the connecting rod 35.

When the stub shafts are in the spread apart position shown, in which the axes of the eccentrics carrying the connecting rods lie in crossed planes, the resulting interlock prevents rotation of both stub shafts. The locking of the stub shaft 30 prevents rotation of the composite gear having the spurs 31 and 32 so that the gear train is locked against rotation and a direct drive is established between the drive shaft gear 26 and the driven shaft gear 27. In such direct drive the shafts 8 and 9 rotate in unison and the cage structure C rotates bodily with the driving and driven shafts.

Figure 3:
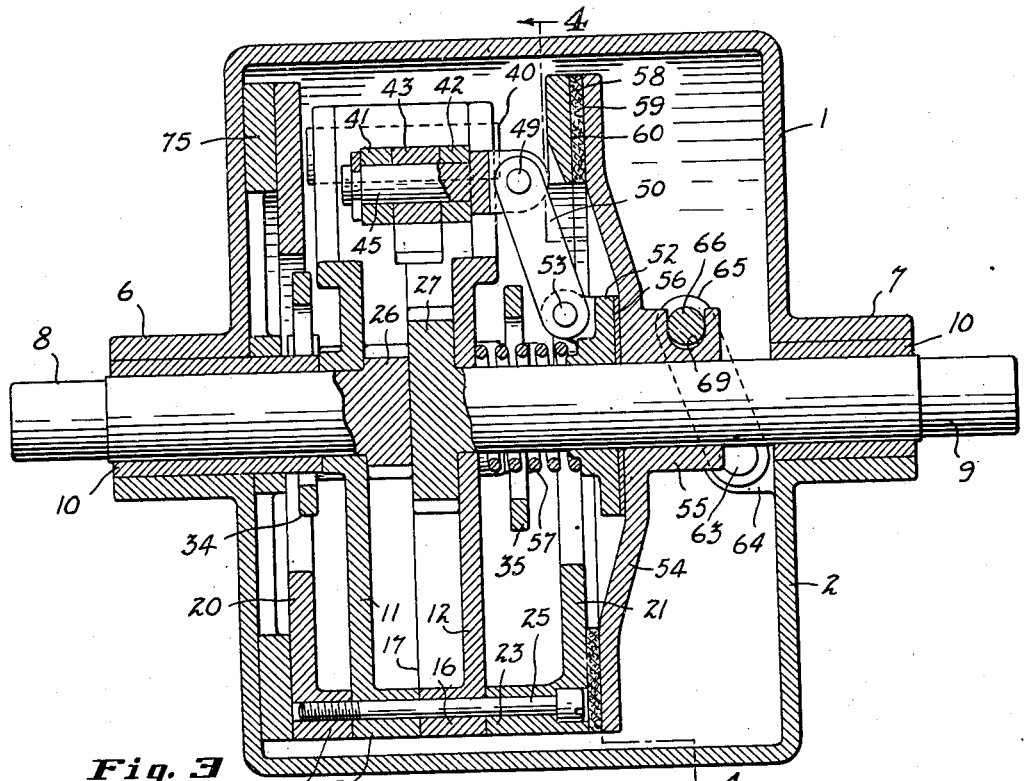
Fig. 3 is a vertical sectional view through the transmission.
Figure 4:
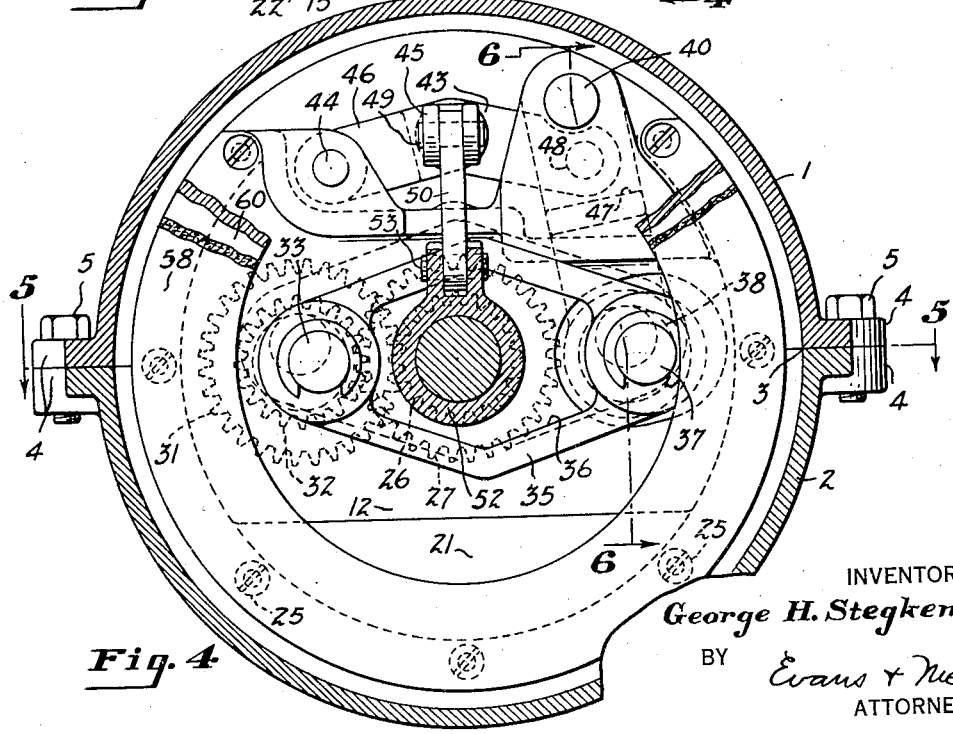
Fig. 4 is a sectional view with parts broken away and removed taken substantially on the line 4—4 of Fig. 3.
Figure 5:
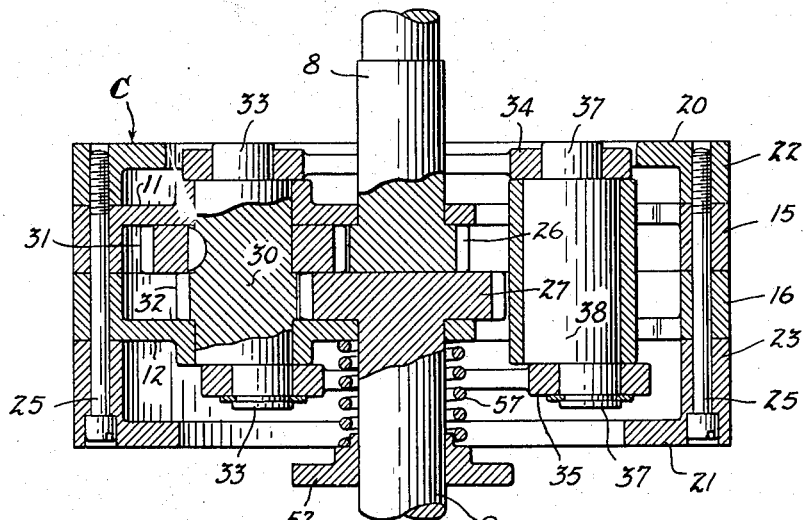
Fig. 5 is a sectional detail, parts being broken away and removed, taken substantially on the line 5—5 of Fig. 4; and, Fig. 6 is a fragmentary sectional detail taken substantially on the line 6—6 of Fig. 4.
Figure 6:
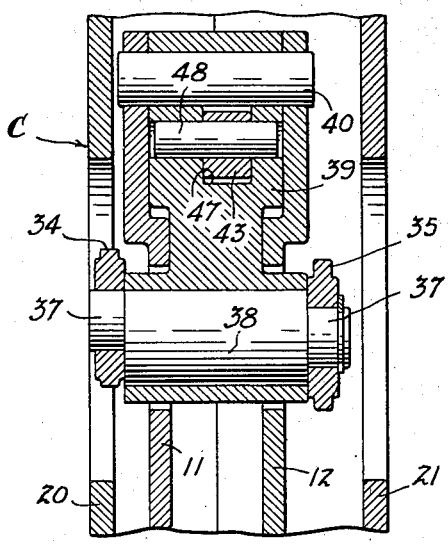

Upon movement of the control rod or shaft 62 to swing the arms 65 to the left, as viewed in Fig. 3, to move the disc 54 to the left, as viewed in that figure, the collar 52 acts through the connecting link 50 to collapse the link arrangement so that the arm 39 swings to the left, as viewed in Figs. 2 and 4, from approximately to the position shown in Fig. 2 to approximately the position shown in Fig. 4. The distance between the axes of the stub shafts 30 and 38 is thus reduced, the shafts moving to relative "neutral" positions in which the connecting rods 34 and 35 function to drive the stub shafts in unison.

The movement of the disc 54 axially along the shaft 9 permitting the toggle arrangement to collapse also moves the friction ring or band 58 into engagement with the face 60 of the cage ring 21, bringing the cage to rest, should it be rotating, and holding the cage in stationary position within the housing. In this connection it is to be observed that the engagement of the crank pin 66 in the slot 69 of the disc hub and the embracing of squared parallel sides of the hub by the crank arms 65 lock the disc 54 against rotation on the shaft. In the movement of the disc 54 against the end of the cage to stop the latter, the entire cage structure and the main shafts may shift axially within the casing. Such movement brings the outer circular face of the cage ring 20 against the mating flat face of a thrust disc 75 mounted on one of the bushings 10 against the end wall of the casing and secured to the latter.

Upon movement of the stub shafts 30 and 38 to "neutral" position in which such shafts are free to rotate in unison, the torque imparted to the gear 26 by the drive shaft 8 sets the gear train in motion to drive the gear 27 on the driven shaft 9 at a relatively lower rotational speed. The parts of the mechanism are so adjusted that when the disc 54 holds the cage against rotation, the clevis pin 45 retains the toggle arrangement in correct position to maintain the stub shafts at neutral spacing.

When the device is in operation and the drive shaft 8 rotating, the torque rotates the gears of the gear train (the cage being held against rotation by the friction brake), tending to cause the stub shaft 38 to swing back and forth toward and away from the stub shaft 30. This movement of the stub shafts is generated by the back and forth movements of the connecting rods 34 and 35. Such movement of the stub shaft 38 tends to cause a back and forth swinging of the arm 39. However, such swinging is restrained by the toggle arrangement which is set to hold the stub shafts either in the neutral position illustrated in Figs. 1, 3 and 4 or in the extended position shown in Fig. 2. In locked position the stub shafts are spaced apart a greater distance than when in neutral or rotative position.

Other locked positions may be employed; for example, the stub shafts may be permitted to move together to a closer spacing than the neutral or rotative position. The movement of the stub shafts between rotative and locked positions is partially self-energized, requiring but small forces in the toggle arrangement and connecting links. As the self-energizing movement of the stub shafts toward and away from one another move the shafts through the locking and neutral positions, the application of but small force is sufficient to retain the stub shafts in the desired attitudes. Thus the control forces imparted through the arm 39 and toggle arrangement are relatively small and the control of the transmission is relatively easy.

If it is desired to utilize the transmission for reversing rather than for changing speed, a reversing gear is included in the gear train. Further, if more than a single speed change or if speed change and speed and reversal are desired, additional units embodying the same principles or of the same construction are arranged in tandem.

The principles of the present invention may be utilized in various ways, numerous modifications and alterations being contemplated, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

What I claim is:

1. In a transmission structure having driving and driven shafts, a cage structure rotatable about the shafts, a gear train including planet and sun gears drivingly connecting the shafts for rotation at different speeds, a pair of rods and means drivingly connecting the same to a planet gear of the gear train, a shaft carried by the cage and arranged for bodily shifting movement laterally, eccentric means on said shaft having connection with the rods for reciprocation of the rods in unison upon actuation of the eccentric means to rotate said shiftable shaft in one position of such shaft, and means for shifting the shiftable shaft for locking the rods against actuation, thereby stopping rotation of the planet gear and locking the gear train and causing the latter and the cage to rotate bodily with the driving and driven shafts and establishing a direct driving connection between said driving and driven shafts.

2. In a transmission structure having driving and driven shafts, a cage structure rotatable about the shafts, a pair of stub shafts mounted in the cage for rotation about substantially parallel axes, one of the stub shafts being shiftable laterally relative to the other, eccentrics on the stub shafts, rod means connecting the stub shafts through the eccentrics, means for shifting said one of the stub shafts laterally to effect a rotation resisting interlock of the stub shafts through the rod means, and a gear train including planet and sun gears mounted in the cage and connecting the driving and driven shafts for rotation at different speeds, a planet gear of said train being secured on a stub shaft, the cage being arranged to rotate bodily with the driving and driven shafts upon lateral shifting of said one stub shaft to locking position thereby stopping rotation of the planet gear whereby to establish a direct drive between the driving and driven shafts.

3. In a transmission structure having driving and driven shafts, a cage structure rotatable about the shafts, stub shafts rotatably mounted in the cage, one of the stub shafts being shiftable laterally relative to the other, eccentrics on the stub shafts, rods connecting the stub shafts through the eccentrics for rotation of the stub shafts in unison, a gear train including planet and sun gears connecting the driving and driven shafts for rotation at different speeds, a planet gear of said train being secured on one of the stub shafts, and means for shifting the other stub shaft laterally to alter the spacing between the stub shafts and thereby effect a rotation resisting interlock through the rod means whereby to stop rotation of the planet gear and to cause bodily rotation of the cage, gear train, stub shafts, and rod means with the driving and driven shafts in a direct drive connection.

4. In a transmission structure having driving and driven shafts journaled for rotation about a common axis, a cage structure mounted for rotation about the shafts, stub shafts journaled in the cage for rotation about substantially parallel axes, one of the stub shafts being shiftable laterally relative to the other, a planetary gear train connecting the driving and driven shafts for rotation at different speeds and including a planet gear secured on one of the stub shafts to rotate the latter, brake means for locking the cage against rotation while the driven shaft is being rotated by the driving shaft through the gear train at a different speed than the drive shaft, eccentrics on the stub shafts, rod means drivingly connecting the stub shafts through the eccentrics, and means for simultaneously releasing the brake to permit rotative movement of the cage and for shifting the other stub shaft laterally relative to said one stub shaft to alter the distance between the stub shafts and thereby effect a rotation resisting interlock to stop rotation of the planet gear, thereby establishing a direct drive connection between the driving and driven shafts in which the cage and the parts carried thereby rotate bodily with the driving and driven shafts.

5. In a transmission structure having aligned driving and driven shafts, a cage structure rotatable about the shafts, a pair of stub shafts and means mounting the same in the cage for rotation about substantially parallel axes and for limited relative shifting movement toward and away from one another, a planetary gear train connecting the driving and driven shafts for differential rotation and including a planet gear rotatable with one of the stub shafts, a pair of rods drivingly connecting the stub shafts for reciprocation of the rods in unison during said differential rotation of the driving and driven shafts, said rods upon relative lateral shifting of the stub shafts being arranged to effect a rotation resisting interlock of the stub shafts to stop rotation of the planet gear and establish a direct drive connection between the driving and driven shafts in which the cage and gear train rotate bodily with the driving and driven shafts, brake means for resisting rotation of the cage, and means simultaneously to effect brake application and relative lateral shifting of the stub shafts to rotative position for enabling the transmission to change from direct drive to differential drive through the gear train.

6. In a transmission having aligned driving and driven shafts and a cage structure bodily rotatable about the shafts, a pair of stub shafts carried by the cage for rotation about generally parallel axes, a planetary gear train within the cage connecting the driving and driven shafts for differential rotation and including a planet gear secured on one of the stub shafts, rods connecting the stub shafts to effect rotation in unison of the stub shafts during said differential driving, the rods being centrally apertured and embracing the driving and driven shafts, and means for varying the distance between the stub shafts to cause the rods to lock the stub shafts against rotation to stop rotation of the planet gear in establishing a direct drive connection between the driving and driven shafts in which the cage, gear train, stub shafts, and rods rotate bodily with the driving and driven shafts.

7. In a transmission structure including driving and driven shafts, a bodily rotatable unit disposed about the shafts, said unit comprising a gear train including planet and sun gears connecting said shafts for rotation at different speeds, eccentric means associated with a planet gear of said train to be actuated thereby, a plurality of rods connected at their ends to the eccentric means for reciprocation of the rods in unison upon actuation of the eccentric means, and laterally shiftable means connecting the other ends of said rods preventing reciprocation of the rods by the eccentrics to stop rotation of the planet gear and thereby lock the gear train and cause bodily rotation of said unit about the driving and driven shafts.

8. In a transmission structure having driving and driven shafts and a cage supported for bodily rotation about one of the shafts, a gear train including planet and sun gears connecting the shafts for rotation at different speeds, said gear train including at least one planet gear rotatably supported by the cage and rotatable bodily with the cage about said one shaft, first eccentric means supported by the cage and connected to said planet gear for rotation synchronously and in unison with the planet gear, second eccentric means, means carried by the cage supporting said second eccentric means for shifting movement toward and away from said first eccentric means, rod means having driving connection with both the first and second eccentric means to effect rotation of the first and second eccentric means in unison in one position of the second eccentric means and to stop rotation of the first eccentric means and the planet gear connected thereto in another position of the second eccentric means, means carried by the cage and rotatable bodily with the cage for governing the shifting movement of the second eccentric means, and means having a rotatable connection with the cage carried governing means for actuating the governing means during bodily rotation of the cage to shift the second eccentric means from said other position in which said rotation of the planet gear is stopped to said one position for rotation of the planet gear.

GEORGE H. STEGKEMPER.

REFERENCES CITED

The following references are of record in the file of this patent:

UNITED STATES PATENTS

| Number | Name | Date |
|---|---|---|
| 792,749 | Arnold | June 20, 1905 |
| 859,393 | Lincoln | July 9, 1907 |
| 1,173,993 | Wise | Feb. 29, 1916 |